(12) United States Patent
Jeong et al.

(10) Patent No.: US 9,417,973 B2
(45) Date of Patent: Aug. 16, 2016

(54) APPARATUS AND METHOD FOR FAULT RECOVERY

(71) Applicant: Samsung Electronics Co., Ltd., Suwon-si (KR)

(72) Inventors: Bok-Deuk Jeong, Yongin-si (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/737,303

(22) Filed: Jan. 9, 2013

(65) Prior Publication Data

US 2013/0179730 A1 Jul. 11, 2013

(30) Foreign Application Priority Data

Jan. 9, 2012 (KR) .................. 10-2012-0002591

(51) Int. Cl.
  *G06F 11/00* (2006.01)
  *G06F 11/14* (2006.01)
(52) U.S. Cl.
  CPC ........ *G06F 11/1471* (2013.01); *G06F 11/1482* (2013.01)
(58) Field of Classification Search
  CPC ............ G06F 11/1471; G06F 11/1435; G06F 11/1469; G06F 11/2064
  USPC .......................................................... 714/20
  See application file for complete search history.

(56) References Cited

U.S. PATENT DOCUMENTS

| | | | |
|---|---|---|---|
| 6,173,311 B1* | 1/2001 | Hassett et al. ................ | 709/202 |
| 7,426,652 B2 | 9/2008 | Liccione et al. | |
| 7,613,749 B2 | 11/2009 | Flynn, Jr. et al. | |
| 2002/0194525 A1* | 12/2002 | Mathiske ............ | G06F 11/1469 714/5.1 |
| 2003/0187911 A1* | 10/2003 | Abd-El-Malek .... | G06F 11/1469 718/108 |
| 2005/0131853 A1* | 6/2005 | Sampath et al. .................. | 707/1 |
| 2006/0075405 A1* | 4/2006 | Sinha ........................... | 718/100 |
| 2008/0294932 A1 | 11/2008 | Oshins et al. | |
| 2010/0293532 A1 | 11/2010 | Andrade et al. | |
| 2011/0173483 A1* | 7/2011 | Lynn ................................. | 714/2 |

OTHER PUBLICATIONS

"Evolving Mach 3.0 to a Migrating Thread Model", University of Utah, 1996, retrieved from https://www.usenix.org/legacy/publications/library/proceedings/sf94/full_papers/ford.pdf.*
Dictionary entry for the term "thread", retrieved from https://en.wikipedia.org/wiki/Thread_(computing).*

(Continued)

*Primary Examiner* — Yair Leibovich
(74) *Attorney, Agent, or Firm* — NSIP Law (57) ABSTRACT

An apparatus and a method for fault recovery are provided. The fault recovery apparatus includes a log manager configured to record system resource allocation information about a thread. The fault recovery apparatus further includes a recovery manager configured to create a recovery thread that substitutes for a target thread where a fault has occurred. The fault recovery apparatus further includes a resource manager configured to map a system resource that the target thread has used to the recovery thread based on referencing to the system resource allocation information.

20 Claims, 6 Drawing Sheets

(56) References Cited

OTHER PUBLICATIONS

Jonathan S. Shapiro, et al. (Sep. 2, 1996). "State Caching in the EROS Kernel—Implementing Efficient Orthogonal Persistence in a Pure Capability System." *In Proc. 7th International Workshop on Persistent Object Systems.* Cape May, New Jersey, USA. May 29-31, 1996. 12 pages.

Jonathan S. Shapiro (1999). "EROS: A Platform for Reliable Applications." available online at http://www.eros-os.org/essays/reliability/paper.html; retrieved Dec. 28, 2012. 9 pages.

* cited by examiner

APPARATUS AND METHOD FOR FAULT RECOVERY

CROSS-REFERENCE TO RELATED APPLICATION

This application claims the benefit under 35 U.S.C. §119 (a) of a Korean Patent Application No. 10-2012-0002591, filed on Jan. 9, 2012, in the Korean Intellectual Property Office, the entire disclosure of which is incorporated herein by reference for all purposes.

BACKGROUND

1. Field

The following description relates to an apparatus and a method to enhance fault-tolerance based on a microkernel.

2. Description of Related Art

Fault-tolerance is the property that enables a system to continue operating properly in the event of one or more faults within some of its components. Fault-tolerance has been applied to server-client environments. In such an environment where a plurality of server programs operate in a plurality of physical computing machines, fault-tolerance may be accomplished by avoiding a computing machine where a fault has occurred and having another computing machine process a service requested by a client.

Applying fault-tolerance to mobile devices, such as smart phones, mobile phones, personal health-care equipment, etc., has been attempted. However, because mobile devices may have low computing power and most of their operations may be processed in local machines, it has been difficult to apply fault-tolerance to mobile devices. For example, due to these limitations of mobile devices, fault-tolerance concepts applied to server-client environments, such as copying and distribution of server programs, may not be applied to mobile devices.

SUMMARY

In one general aspect, there is provided a fault recovery apparatus including a log manager configured to record system resource allocation information about a thread. The fault recovery apparatus further includes a recovery manager configured to create a recovery thread that substitutes for a target thread where a fault has occurred. The fault recovery apparatus further includes a resource manager configured to map a system resource that the target thread has used to the recovery thread based on referencing to the system resource allocation information.

The recovery thread replays operation of the target thread while using the system resource that the target thread has used based on the referencing to the system resource allocation information.

The log manager creates a tuple including system call request information of a thread and a response to the system call request, and records the tuple in each entry of a predetermined log table.

The log manager is on a kernel level that provides an execution environment of a task including the target thread.

The log manager is on a user level in which a task, including the target thread, operates.

The log manager records the system resource allocation information based on a system call wrapper library.

The log manager deletes unnecessary system resource allocation information based on a state type of a task including the target thread.

The recovery manager maintains the system resource that the target thread has used, without releasing the system resource.

The recovery manager sets execution context of the recovery thread such that the recovery thread replays operation of the target thread.

The recovery manager is included in a task including the target thread.

The fault recovery apparatus further includes a recovery thread protector configured to protect the recovery manager from the fault of the target thread based on an address space identifier (ASID).

The recovery manager is on a loader that creates a task including the target thread.

In response to receiving a system resource allocation request from the recovery thread, the resource manager returns the system resource that the target thread has used to the recovery thread based on the referencing to the system resource allocation information.

The resource manager is included in a system call interface of a task including the target thread.

The fault recovery apparatus further includes an inter-process communication (IPC) manager configured to provide an IPC message related to the target thread, to the recovery thread.

The IPC manager changes an IPC endpoint of the target thread such that the IPC endpoint indicates the recovery thread.

The IPC manager retransmits an IPC message of a client task to the recovery thread.

The IPC manager is on a kernel level that provides an execution environment of a task including the target thread.

In another aspect, a fault recovery method includes recording system resource allocation information about a thread. The fault recovery method further includes creating a recovery thread that substitutes for a target thread where a fault has occurred. The fault recovery method further includes mapping a system resource that the target thread has used to the recovery thread based on referencing to the system resource allocation information.

The fault recovery method further includes providing an inter-process communication (IPC) message related to the target thread to the recovery thread.

In yet another aspect, a fault recovery apparatus includes a recovery thread generator configured to generate a recovery thread related to a faulty target thread. The fault recovery apparatus further includes a recovery controller configured to provide a system resource of the faulty target thread to the recovery thread based on recorded system resource information of the faulty target thread.

The recovery controller is further configured to change an inter-process communication (IPC) endpoint that indicates the target thread to indicate the recovery thread.

The recovery controller is further configured to provide an inter-process communication (IPC) message of the target thread to the recovery thread.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
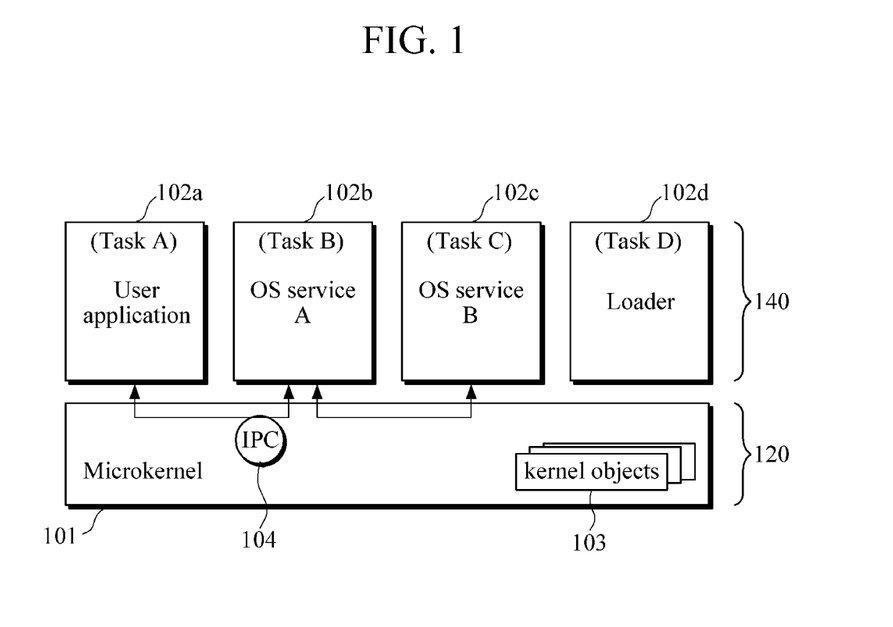
FIG. 1 is a diagram illustrating an example of a system environment where a fault recovery apparatus operates.

FIG. 1 is a diagram illustrating an example of a system environment where a fault recovery apparatus operates. For example, the fault recovery apparatus may be applied to a microkernel-based operating system (OS) environment. The microkernel-based OS environment may include a kernel level 120 and a user level 140.

In the microkernel-based OS environment, the kernel level 120 may provide fundamental functions of the OS, and the user level 140 may provide other OS functions in the form of tasks. In other words, a microkernel 101 may perform the fundamental OS functions, such as, for example, scheduling, management of a page table, etc., and the user level 140 may perform the remaining OS functions through individual tasks 102a through 102d. For example, a specific task (for example, 102b or 102c) may manage system resources and may provide an OS service to another task (for example, 102a that may provide a user application).

The microkernel 101 may include a plurality of kernel objects 103 that manage, for example, inter-process communication (IPC), task information, thread information, etc. The tasks 102a through 102d on the user level 140 may use system resources that are in the form of the kernel objects 103 provided by the microkernel 101. Also, the tasks 102a through 102d may use system resources provided by another task through an IPC object 104 provided by the microkernel 101.

A specific task (for example, 102d) may create another task (for example, 102c), to allocate a fundamental resource to the other task, to create a thread that is to be initially executed in the other task, to bind the thread with the other task, and to start the thread. In this example, the task 102d may be referred to as a loader and a parent task of the created task 102c. When execution of a certain task (for example, 102c) is terminated, the loader 102d may receive a termination signal from the certain task or from a thread belonging to the certain task, and may process the termination signal.

Figure 2:
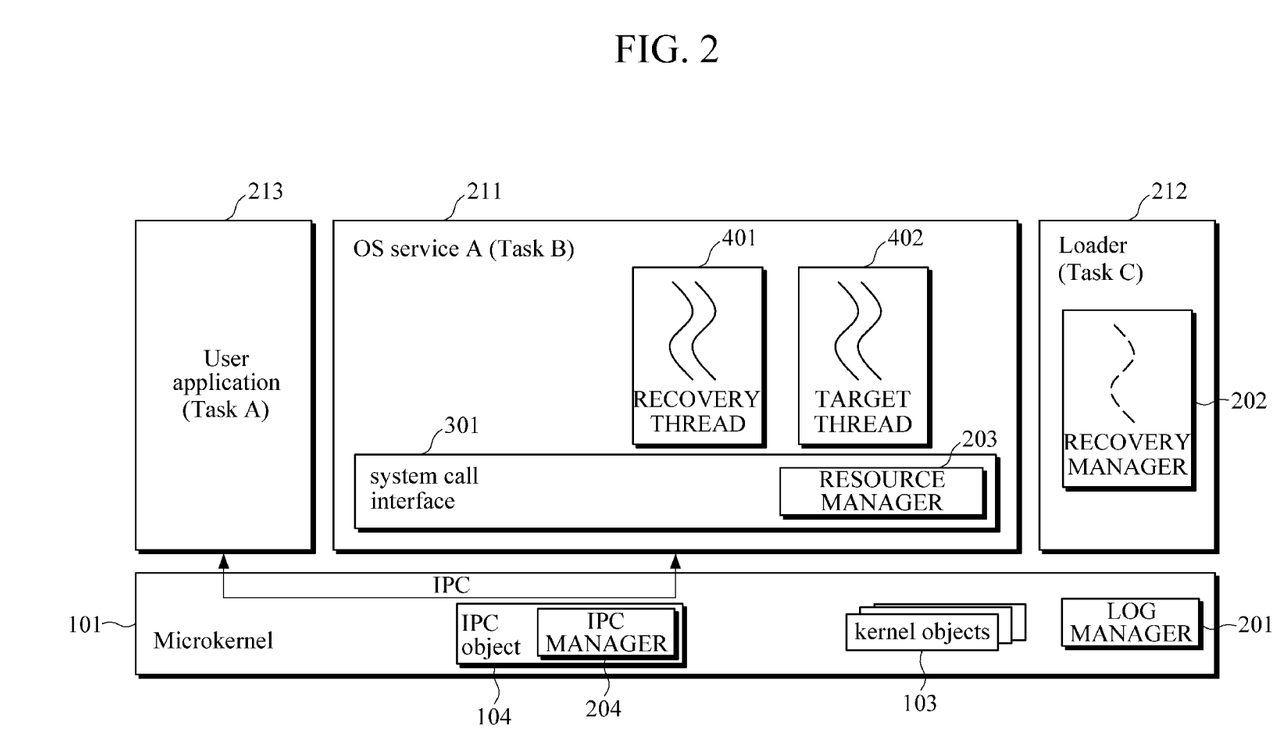
FIG. 2 is a diagram illustrating an example of the fault recovery apparatus.

FIG. 2 is a diagram illustrating an example of a fault recovery apparatus that operates in the system environment of FIG. 1. Referring to FIG. 2, the fault recovery apparatus may include a log manager 201, a recovery manager 202, and a resource manager 203. The log manager 201 may record system resource allocation information about threads to be executed in tasks 211, 212, and 213. For example, while a certain task (for example, 211) operates normally, the log manager 201 may record information about system resources that the certain task, or a thread (for example, 402) belonging to the certain task, has requested and allocated from another task (for example, 213). The log manager 201 may record this information about the system resources in a predetermined log table.

In addition, the log manager 201 may record information about a service that the certain task (for example, 211) or the thread (for example, 402) has provided to another client task (for example, 213), in the log table. Each entry of the log table may be in the form of a tuple that may include a thread identifier, system call request information, and a response to a system call request. If a log table is created for every thread, the thread identifier may be excluded from entries of such a log table. The system call request information and the response to the system call request may include a register value and information about a user thread control block (UTCB) to process a system call. The UTCB may be a memory block that provides local storage for threads and per-thread message registers transferred during an IPC between two threads.

The system resource allocation information recorded by the log manager 201 may be referred to when recovering a faulty task or thread. For example, when a recovery thread 401 that substitutes for a faulty task (hereinafter, referred to as a target task 211) or a faulty thread (hereinafter, referred to as a target thread 402) replays an operation of the target thread 402, the recovery thread 401 may use system resources that the target task 211 or the target thread 402 have used by referencing to the system resource allocation information. Accordingly, the faulty target task 211 or the faulty target thread 402 may be quickly recovered.

The log manager 201 may delete unnecessary information from the log table. For example, regarding a stateless server task, transaction information received/transmitted from/to a client task may be deleted from the log table because such a task may be treated as an independent transaction unrelated to any previous transaction. In another example, if a server task has allocated IPC to a client task and the IPC has been deleted due to termination of a service for the corresponding client, new IPC allocation requests from the client task, responses from the server task with respect to the IPC allocation requests, and message transaction information through the new IPC may be deleted from the log table. Because the recovery thread 401 replays the operation of the target thread 402 with reference to the log table, deleting unnecessary information that does not need to be replayed from the log table may contribute to quicker recovery of the faulty target task 211 or the faulty target thread 402.

The log manager 201 may be on a kernel level, that is, on the microkernel 101. However, the location of the log manager 201 is not limited to this location.

When a fault occurs in a certain task (for example, 211), the recovery manager 202, which may be referred to as a recovery thread generator, may terminate a thread (for example, 402) that caused the fault without releasing system resources that the task has used. The recovery manager 202 may then create or generate the recovery thread 401 that substitutes for the faulty thread. That is, the recovery thread 401 may function as a thread that executes fault recovery, replacing the faulty thread.

The recovery manager 202 may create the recovery thread 401 based on a predetermined recovery request. The predetermined recovery request may be received from, for example, a loader 212, a page fault handler, an exception handler, a fault sensing module, a fault prediction module, etc. For example, the loader 212 may be a parent task of the target task 211, e.g., a child task 211. When the child task 211 is terminated, the parent task 212 may receive a predetermined termination message from the child task 211. The loader 212 may analyze the received termination message to determine whether the termination of the child task 211 or the thread 402 belonging to the child task 211 is normal or abnormal, and may transmit the predetermined recovery request to the recovery manager 202 based on the result of the determination. In another example, when a page fault occurs in a task or a thread belonging to the task because the task or the thread has referred to abnormal memory, the page fault handler may transfer the predetermined recovery request to the recovery manager 202.

The recovery manager 202 may set execution context of the created recovery thread 401 to thereby prepare execution of the recovery thread 401. For example, the recovery manager 202 may set the execution context of the recovery thread 401 by setting a flag informing that the recovery thread 401 operates in a recovery mode, by recording information about access to a log table, etc. in a stack that is an environmental variable storage area of the recovery thread 401. In addition, the recovery manager 202 may set an execution location of an instruction that the recovery thread 401 has to first execute, may set whether recovery is needed, may set a state type (for example, stateless or stateful) of the fault task or thread, etc., to set information for recovery. The execution location of the instruction may be an entry point that is designated by a program code header of the target thread 402.

The recovery manager 202 may map the created recovery thread 401 to a task (for example, the target task 211) having the target thread 402. Accordingly, the recovery thread 401 may be executed according to a context of the target thread 402.

The recovery manager 202 may request the microkernel 101 to perform IPC redirection. The microkernel 101 that has received the IPC redirection request may collect kernel objects (for example, 103) allocated to the target task 211. The microkernel 101 may change an IPC endpoint of the target thread 402 such that the IPC endpoint indicates the recovery thread 401 instead of the target thread 402.

The recovery manager 202 may allocate a memory area for the log table recorded by the log manager 201 such that the log table is shared with the microkernel 101 or the target task 211. Once the memory area is allocated, the recovery manager 202 may set the corresponding memory area to "pinned property" to reduce overhead due to paging of the memory area. Then, the recovery manager 202 may provide the target task 211 with access to the memory area, and may map an address space of the target task 211 to the memory area. Also, the recovery manager 202 may perform page touch in advance to prevent a page fault from happening during runtime because no mapping relationship between a virtual address of the memory area for the log table and a physical address of a real page has been written in a page table. Page touch refers to an action for information corresponding to a page to be written in an actual page table by reading or writing a portion of the page in advance, in order to prevent the allocated memory area from being missed while using it.

The recovery manager 202 may be on a user level, that is, on the loader 212. However, it is also possible that the recovery manager 202 is on the kernel level, e.g., the microkernel 101.

The resource manager 203, which may be referred to as a recovery controller, may map the system resources that the target thread 402 has used, to the recovery thread 401 by referencing to the system resource allocation information recorded by the log manager 201. Accordingly, when the recovery thread 401 replays the operation of the target thread 402 in the recovery mode, the recovery thread 401 may be able to use the system resources allocated to the target thread 402, thereby reducing a processing time for system resource allocation. For example, the resource manager 203 may receive a system resource allocation request from the recovery thread 401, and may return or provide the system resources that the target thread 402 has used, to the recovery thread 401 by referencing to the system resource allocation information recorded by the log manager 201.

The resource manager 203 may be included in a system call interface 301 of the task 211 having the target thread 402. Accordingly, the recovery thread 401 may quickly use the system resources of the target thread 402, and may neither add IPC overhead nor require context switching.

The IPC manager 204, which may be referred to as the recovery controller, may provide an IPC message related to the target thread 402, to the recovery thread 401. For example, the IPC manager 204 may change an IPC endpoint of the target thread 402 such that the IPC endpoint indicates the recovery thread 401 instead of the target thread 402. In another example, the IPC manager 204 may retransmit an IPC message of a client task (e.g., the IPC message related to the target thread 402) to the recovery thread 401. In other words, the target thread 402 operates as an OS service to a thread to which a recovery is needed in a case of a service fault, receives an IPC message including an OS service request from a client task or thread, and replies to the IPC message.

If a fault occurs while the target thread 402 is processing an IPC message received from a client, a result of the processing of the IPC message may not be transmitted to the client. Accordingly, the client may stay in a response waiting state. The IPC manager 204 may allow the recovery thread 401 to continue transmitting the IPC message to the client, in place of the faulty target thread 402, thereby providing a transparent recovery environment. For example, when the recovery thread 401 calls an IPC standby system call to receive an IPC message, the microkernel 101 may determine whether there is a client task that waits for the result of the processing on the IPC message. If a client task that waits for the result of the processing on the IPC message is found, the microkernel 110 may terminate an IPC handshake routine being executed, and may retransmit the IPC message to the recovery thread 401 so that the recovery thread 401 may continue transmitting the IPC message to the client. The IPC manager 204 may be included in the IPC object 104 of the microkernel 101.

The log manager 201, the recovery manager 202, the resource manager 203, and the IPC manager 204 may be implemented in the form of threads or thread elements. Also, the classification of these threads into the separated elements is for example only. Accordingly, the elements may be integrally or separately implemented, and a part of functions of an element may be performed by another element(s).

Figure 3:
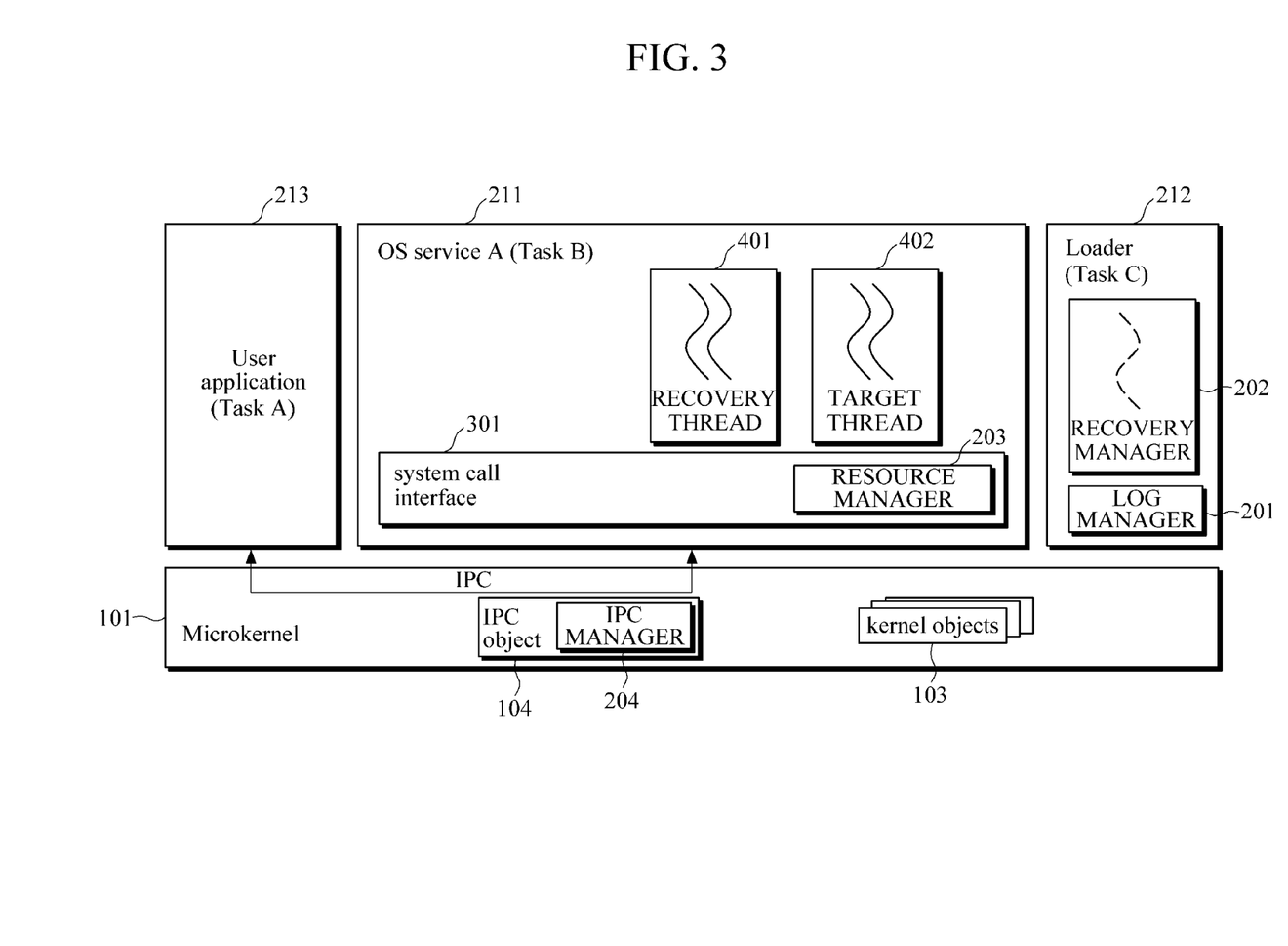
FIG. 3 is a diagram illustrating another example of the fault recovery apparatus.

FIG. 3 is a diagram illustrating another example of the fault recovery apparatus. The fault recovery apparatus may include the log manager 201, the recovery manager 202, the resource manage 203, and the IPC manager 204. Details about these individual elements have been described above with reference to FIG. 2.

In contrast to the example of FIG. 2, the log manager 201 of FIG. 3 may be on the user level, that is, on the loader 212, instead of being on the microkernel 101. The log manager 201 on the loader 212 may record system resource allocation information with the help of a system call wrapper library. For example, if the system call wrapper library extracts the system resource allocation information and transfers it to the log manager 201, the log manager 201 may record the received system resource allocation information in a log table. In another example where the log manager 201 is on the loader 212, the resource manager 203 included in the system call interface 301 of the target task 211, may provide system call request information and a response to a system call request to the log manager 201 to be recorded.

Figure 4:
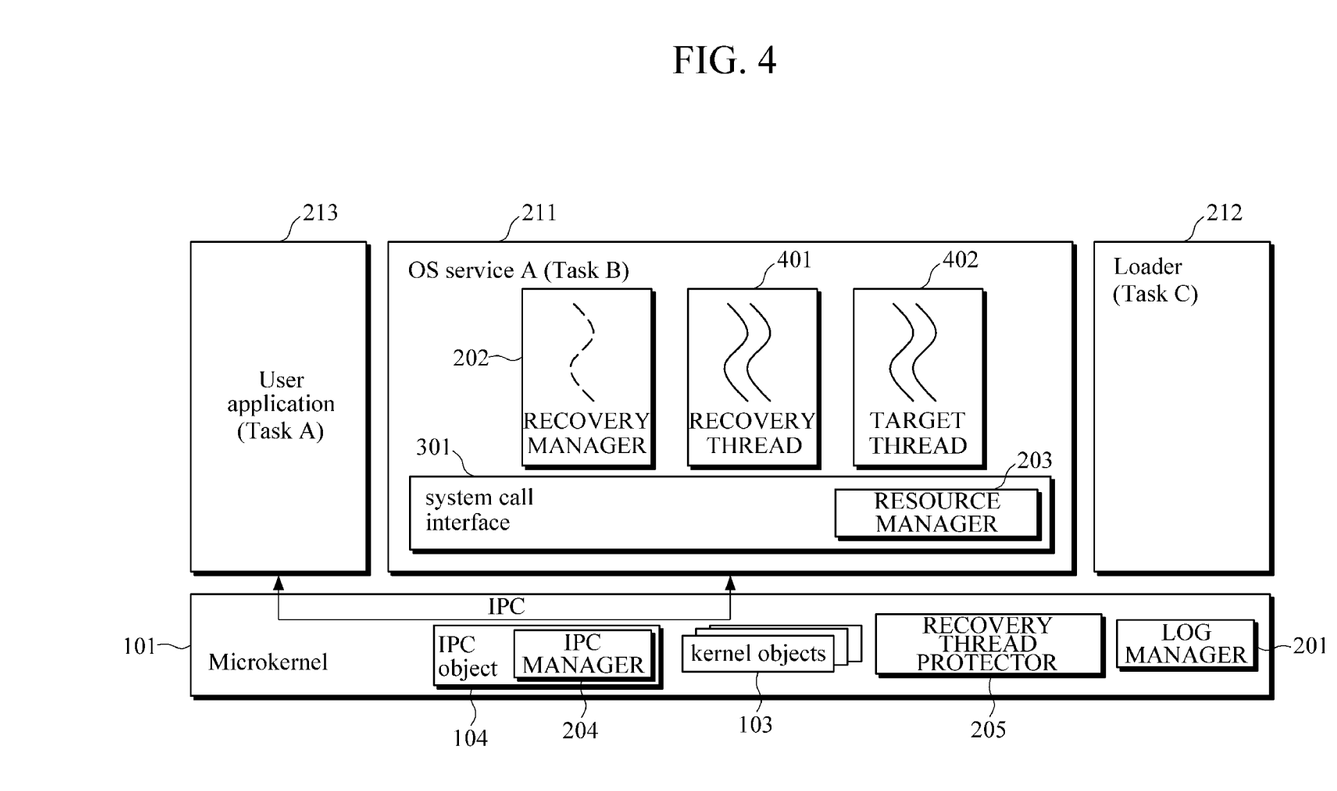
FIG. 4 is a diagram illustrating another example of the fault recovery apparatus.

FIG. 4 is a diagram illustrating another example of the fault recovery apparatus. The fault recovery apparatus may include the log manager 201, the recovery manager 202, the resource manager 203, the IPC manager 204, and a recovery thread protector 205 on the microkernel 101. Details about the log manager 201, the recovery manager 202, the resource manager 203, and the IPC manager 204 have been described above with reference to FIG. 2.

In contrast to the example of FIG. 2, the recovery manager 202 of FIG. 4 may be included in the target task 211. If the recovery manager 202 is included in the target task 211, the recovery manager 202 may have to be unaffected by faults of threads (for example, the target thread 402) in the target task 211.

The recovery thread protector 205 may protect the recovery manager 202 or threads belonging to the recovery manager 202 from the faults of the threads in the target task 211 based on an address space identifier (ASID). Details about the functions of the recovery thread protector 205 will be described below with reference to FIG. 5.

The recovery manager 202 may allocate a memory area for a log table recorded by the log manager 201 such that the log table is shared with the microkernel 101 or a task (for example, 211). To reduce overhead due to paging of the allocated memory area, the recovery manager 202 may set the corresponding memory area to "pinned property". Then, the recovery manager 202 may map the memory area to an address space of the target task 211. In contrast to the example of FIG. 2, because the recovery manager 202 is included in the target task 211, the target task 211 may access the allocated memory area, even though the target task 211 is not allocated a right to access the memory area. Also, the recovery manager 202 may perform page touch in advance to prevent a page fault from happening during runtime because no mapping relationship between a virtual address of the memory area for the log table and a physical address of a real page has been written in a page table.

Figure 5:
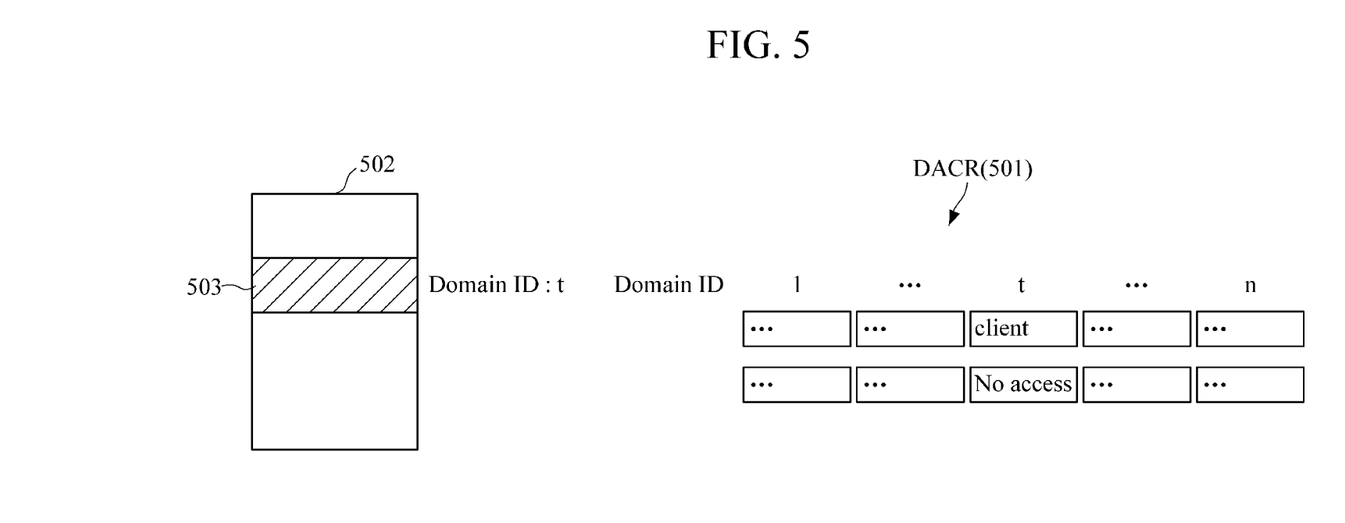
FIG. 5 is a diagram illustrating an example of a protection method that is performed by a recovery manager and a recovery thread protector of the fault recovery apparatus.

FIG. 5 is a diagram illustrating an example of a protection method that is performed by the recovery manager 202 and the recovery thread protector 205 in FIG. 4. Referring to FIG. 5, the recovery manager 202 may be protected by an address space identifier (ASID) that is provided through a domain access control register (DACR) 501. For example, the recovery thread protector 205 may allocate an ASID (for example, t) that has not yet been allocated to a thread, to a memory area 503 to be used by the recovery manager 202 among a memory area 502 used by the target task 211.

Also, the recovery thread protector 205 may set an access permission for access to the corresponding memory area 503 based on what type of thread is executed. If the recovery thread 401 is scheduled, the recovery thread protector 205 may set a permission of a domain ID (t) among n values of the DACR 501 to a value (e.g., "client") designated in a Transition Look-aside Buffer (TLB) entry. The value designated in the TLB entry allows the scheduled recovery thread 401 to access the memory area 503. If another thread (e.g., a non-recovery thread) is scheduled, the recovery thread protector 205 may set a permission of the domain ID (t) to "No Access", which represents that the corresponding non-recovery thread may not access the memory area 503 regardless of an access right designated by the TLB entry.

Figure 6:
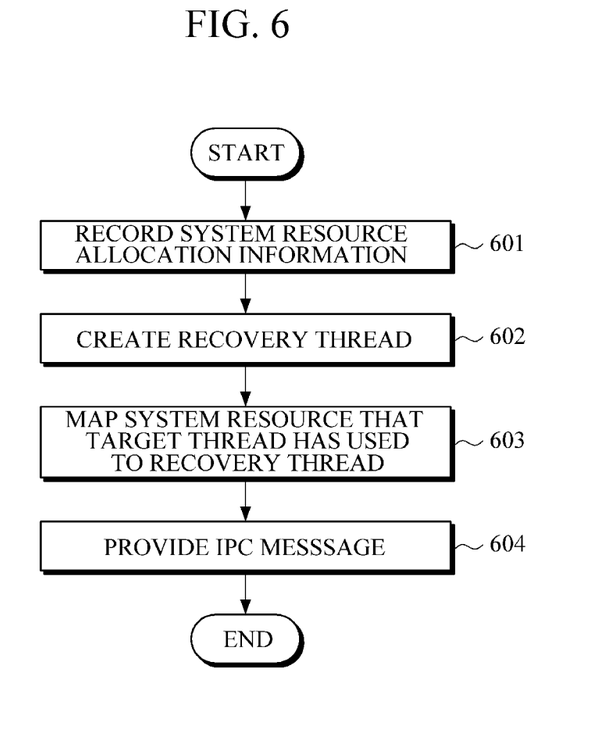
FIG. 6 is a flowchart illustrating an example of a fault recovery method.

FIG. 6 is a flowchart illustrating an example of a fault recovery method. The fault recovery method may be performed by the fault recovery apparatus as illustrated in FIGS. 2 through 4. Referring to FIG. 6, system resource allocation information about threads may be recorded (step 601). For example, the log manager 201 in FIGS. 2-4 may create a tuple including system call request information of a thread and a response to the system call request, and may record the tuple in each entry of a predetermined log table.

A recovery thread that substitutes for a target thread where a fault has occurred may be created (step 602). For example, the recovery manager 202 may create the recovery thread 401 to replay the operation of the target thread 402, with reference to the recorded system resource allocation information, and to use system resources that the target thread 402 has used without releasing these system resources.

The system resources may be mapped to the recovery thread based on the system resource allocation information (step 603). For example, the resource manager 203 may receive a system resource allocation request from the recovery thread 401, and may return the system resources that the target thread 402 has used, to the recovery thread 401 by referencing to the system resource allocation information.

An IPC message related to the target thread may be provided to the recovery thread (step 604). For example, the IPC manager 204 may change an IPC endpoint of the target thread 402 such that the IPC endpoint indicates the recovery thread 401 instead of the target thread 402, or the IPC manager 204 may retransmit an IPC message of a client task to the recovery thread 401.

According to the teachings above, there is provided a method in which fault recovery may be accomplished while using system resources that a faulty task or thread has used. Accordingly, rapid fault recovery may be possible. Moreover, because an IPC message may be provided to a recovery thread, a transparent recovery environment may be provided.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more non-transitory computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fault recovery apparatus including a processor and comprising:
   a log manager configured to record system resource allocation information about a thread based on a system call wrapper library;
   a recovery manager configured to create a recovery thread that substitutes for a target thread where a fault has occurred and, set execution context of the recovery thread by recording information for recovery to an environmental variable storage area of the recovery thread such that the recovery thread replays operation of the target thread; and
   a resource manager configured to map a system resource that the target thread has used to the recovery thread based on referencing to the system resource allocation information, wherein the log manager records the system resource allocation information based on a system call wrapper library.

2. The fault recovery apparatus of claim 1, wherein the recovery thread replays operation of the target thread while using the system resource that the target thread has used based on the referencing to the system resource allocation information.

3. The fault recovery apparatus of claim 1, wherein the log manager creates a tuple comprising system call request information of a thread and a response to the system call request, and records the tuple in each entry of a predetermined log table.

4. The fault recovery apparatus of claim 1, wherein the log manager is on a kernel level that provides an execution environment of a task comprising the target thread.

5. The fault recovery apparatus of claim 1, wherein the log manager deletes unnecessary system resource allocation information based on a state type of a task comprising the target thread.

6. The fault recovery apparatus of claim 1, wherein the recovery manager maintains the system resource that the target thread has used, without releasing the system resource.

7. The fault recovery apparatus of claim 1, wherein the recovery manager is included in a task comprising the target thread.

8. The fault recovery apparatus of claim 7, further comprising a recovery thread protector configured to protect the recovery manager from the fault of the target thread based on an address space identifier (ASID).

9. The fault recovery apparatus of claim 1, wherein the recovery manager is on a loader that creates a task comprising the target thread.

10. The fault recovery apparatus of claim 1, wherein in response to receiving a system resource allocation request from the recovery thread, the resource manager returns the system resource that the target thread has used to the recovery thread based on the referencing to the system resource allocation information.

11. The fault recovery apparatus of claim 1, wherein the resource manager is included in a system call interface of a task comprising the target thread.

12. The fault recovery apparatus of claim 1, further comprising an inter-process communication (IPC) manager configured to provide an IPC message related to the target thread, to the recovery thread.

13. The fault recovery apparatus of claim 12, wherein the IPC manager changes an IPC endpoint of the target thread such that the IPC endpoint indicates the recovery thread.

14. The fault recovery apparatus of claim 12, wherein the IPC manager retransmits an IPC message of a client task to the recovery thread.

15. The fault recovery apparatus of claim 12, wherein the IPC manager is on a kernel level that provides an execution environment of a task comprising the target thread.

16. A fault recovery method comprising:
   recording system resource allocation information about a thread based on a system call wrapper library;
   creating a recovery thread that substitutes for a target thread where a fault has occurred;
   setting execution context of the recovery thread by recording information for recovery to an environmental variable storage area of the recovery thread such that the recovery thread replays operation of the target thread; and
   mapping a system resource that the target thread has used to the recovery thread based on referencing to the system resource allocation information.

17. The fault recovery method of claim 16, further comprising providing an inter-process communication (IPC) message related to the target thread to the recovery thread.

18. A fault recovery apparatus including a processor and comprising:
   a log manager configured to record system resource allocation information about a thread based on a system call wrapper library;
   a recovery thread generator configured to generate a recovery thread related to a faulty target thread and, set execution context of the recovery thread by recording information for recovery to an environmental variable storage area of the recovery thread such that the recovery thread replays operation of the target thread; and
   a recovery controller configured to provide a system resource of the faulty target thread to the recovery thread based on recorded system resource information of the faulty target thread.

19. The fault recovery apparatus of claim 18, wherein the recovery controller is further configured to change an inter-process communication (IPC) endpoint that indicates the target thread to indicate the recovery thread.

20. The fault recover apparatus of claim 18, wherein the recovery controller is further configured to provide an inter-process communication (IPC) message of the target thread to the recovery thread.

* * * * *